United States Patent
Liu et al.

(10) Patent No.: US 10,901,156 B2
(45) Date of Patent: Jan. 26, 2021

(54) OPTICAL FIBER ADAPTERS AND CONNECTORS HAVING WAVELENGTH FILTERING COMPONENTS

(71) Applicant: AFL Telecommunications LLC, Duncan, SC (US)

(72) Inventors: Bin Liu, Chestnut Hill, MA (US); Scott Prescott, Belmont, NH (US); Dale Eddy, Gilford, NH (US); Michael Scholten, Westford, MA (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/336,311

(22) PCT Filed: Sep. 18, 2017

(86) PCT No.: PCT/US2017/052066
§ 371 (c)(1),
(2) Date: Mar. 25, 2019

(87) PCT Pub. No.: WO2018/063841
PCT Pub. Date: Apr. 5, 2018

(65) Prior Publication Data
US 2020/0026006 A1    Jan. 23, 2020

Related U.S. Application Data

(60) Provisional application No. 62/400,146, filed on Sep. 27, 2016.

(51) Int. Cl.
*G02B 6/38* (2006.01)
(52) U.S. Cl.
CPC ......... *G02B 6/3845* (2013.01); *G02B 6/3825* (2013.01); *G02B 6/3846* (2013.01)

(58) Field of Classification Search
None
See application file for complete search history.

(56) References Cited

U.S. PATENT DOCUMENTS 3,514,174 A * 5/1970 Gans .................. G02B 5/281
                                                                    359/359
5,821,510 A * 10/1998 Cohen ................. G02B 6/3807
                                                                    235/375

(Continued)

FOREIGN PATENT DOCUMENTS

DE    102006002605 A1 *  7/2008  ............. G02F 1/065
JP        62121405 A  *  6/1987  ............. G02B 6/266

(Continued)

OTHER PUBLICATIONS

Ito et al., EPO Machine Translation of Description of JP 2000-266939A, Sep. 29, 2000. (Year: 2000).*

(Continued)

*Primary Examiner* — Michelle R Connelly
(74) *Attorney, Agent, or Firm* — Dority & Manning, P.A.

(57) ABSTRACT

Optical fiber adapters and connectors are provided. An optical fiber adapter includes an adapter body, the adapter body extending along a longitudinal axis between a first end and a second end and comprising a first adapter portion which includes the first end and a second adapter portion which includes the second end. Each of the first adapter portion and the second adapter portion is one of a male adapter portion or a female adapter portion. The optical fiber adapter further includes a ferrule disposed within the adapter body, the ferrule extending along the longitudinal axis between a first end and a second end, and a thin-film filter provided on one of the first end or the second end of the ferrule, wherein the thin-film filter limits the wavelengths of light transmitted therethrough to within a predetermined wavelength range.

22 Claims, 4 Drawing Sheets

(56) References Cited

U.S. PATENT DOCUMENTS

| | | | |
|---|---|---|---|
| 6,280,099 B1 * | 8/2001 | Wu | G02B 6/2937 385/70 |
| 8,480,310 B2 * | 7/2013 | Kewitsch | G02B 6/3825 385/73 |
| 8,588,571 B1 | 11/2013 | Lam et al. | |
| 2003/0142918 A1 * | 7/2003 | Melchior | G02B 6/3825 385/76 |
| 2004/0042710 A1 | 3/2004 | Margalit et al. | |
| 2004/0161220 A1 * | 8/2004 | Treptau | G02B 6/29361 385/137 |
| 2004/0258363 A1 | 12/2004 | Shigihara et al. | |
| 2008/0019642 A1 | 1/2008 | Kewitsch | |
| 2009/0207495 A1 * | 8/2009 | Yamaguchi | G02B 5/286 359/588 |
| 2010/0074616 A1 | 3/2010 | Kewitsch | |
| 2010/0104243 A1 * | 4/2010 | Kewitsch | G02B 6/3825 385/60 |
| 2012/0093464 A1 | 4/2012 | Wu | |
| 2013/0163629 A1 * | 6/2013 | Lee | H01S 5/141 372/44.01 |
| 2018/0172914 A1 * | 6/2018 | Treadwell | G02B 6/264 |
| 2018/0196191 A1 * | 7/2018 | Wang | G02B 6/3845 |

FOREIGN PATENT DOCUMENTS

| | | | | | |
|---|---|---|---|---|---|
| JP | 02195306 A | * | 8/1990 | | G02B 6/3845 |
| JP | 06250017 A | * | 9/1994 | | |
| JP | 11218617 A | * | 8/1999 | | |
| JP | 2000009939 A | * | 1/2000 | | |
| JP | 2000266939 A | * | 9/2000 | | |
| JP | 2005134803 A | * | 5/2005 | | G02B 6/4246 |
| JP | 2005208089 A | * | 8/2005 | | |
| JP | 2005234191 A | * | 9/2005 | | |
| JP | 2009205105 A | * | 9/2009 | | |
| KR | 20140101897 A | | 8/2014 | | |
| WO | WO-2016200518 A1 | * | 12/2016 | | G02B 6/25 |

OTHER PUBLICATIONS

AFL Telecommunications LLC; International Patent Application No. PCT/US2017/052066; International Search Report; dated Nov. 24, 2017; (1 page).

AFL Telecommunications LLC; EP Patent Application No. 177772854.0; EP Office Action; dated Jul. 21, 2020; (2 pages).

* cited by examiner

OPTICAL FIBER ADAPTERS AND CONNECTORS HAVING WAVELENGTH FILTERING COMPONENTS

CROSS-REFERENCE TO RELATED APPLICATIONS

This application is a National Stage Patent Application of PCT/US2017/052066, filed on Sep. 18, 2017, which claims the benefit of priority to U.S. Provisional Patent Application No. 62/400,146, filed on Sep. 27, 2016, the disclosures of all of which are incorporated by reference herein in their entireties.

FIELD

The present disclosure relates generally to optical fiber adapters and connectors, and more particularly to optical fiber adapters and connectors which include components which provide in-line wavelength filtering. In exemplary embodiments, such adapters and connectors are provided for use with fiber-optic power meters, although other suitable uses are within the scope and spirit of the present disclosure.

BACKGROUND

Generic optical power meters capable of optical wavelength filtering have long been demanded by a variety of application fields such as testing of fiber optic transmission systems. Existing technologies such as optical spectrum analyzers and WDM power meters/monitors can provide such functionality. However, these instruments tend to have a high cost and are relatively bulky, which hinders their use in the field. One known apparatus provides a simple interface adapting fiber optic connectors to generic optical power meters for wavelength-selective power measurement, but with a limited selection of wavelengths.

Additionally, at times it becomes necessary to selectively filter optical wavelengths being transmitted through an optical fiber. Currently, a filter module or tunable filter providing the required filtering profile (band-pass, band-reject, low-pass, high-pass, etc.) is required. Both options can be expensive and in some cases require drive/interface electronics in order to function.

Accordingly, improved apparatus for wavelength filtering which address one or more of the above-stated issues are desired.

BRIEF DESCRIPTION

Aspects and advantages of the invention will be set forth in part in the following description, or may be obvious from the description, or may be learned through practice of the invention.

The present disclosure relates generally to optical fiber adapters and connectors which include components which advantageously provide in-line wavelength filtering. In particular, such adapter and connectors include thin-film filters provided on the ends of ferrules thereof. Accordingly, such adapters and connectors advantageously provide low-cost, uncomplicated, and easy to use apparatus, with a wide range of filtering options advantageously available.

In some embodiments, the present disclosure provides a low-cost and easily-implemented apparatus to interface fiber optic connectors to generic optical power meters or other fiber optic connectors, without altering either the connector or power meter, yet providing sufficient wavelength filtering functionality.

In some embodiments, the present disclosure may provide simple low-cost and less complex apparatuses for using generic optical power meters for measuring the power of optical signals within selected wavelengths, which are particularly suitable for field testing of fiber optic transmission systems.

In some embodiments, the present disclosure may provide a low-cost solution for generic optical power meters to measure the optical power of selected spectral components within aggregate optical signals transmitted in fiber optic systems.

In some embodiments, the present disclosure may provide a low-cost easily-implemented apparatus to insert an optical filter in-line with an optical fiber providing sufficient wavelength filtering/selection functionality. The reduction in the number of parts to achieve the desired wavelength filtering profiles reduces the cost and complexity of the apparatus. This can reduce the cost to the point where a user can afford multiple filtering variations of the apparatus to meet whatever wavelength filtering needs they may have.

For example, in accordance with some embodiments, an optical fiber adapter is provided. The optical fiber adapter includes an adapter body, the adapter body extending along a longitudinal axis between a first end and a second end and including a first adapter portion which includes the first end and a second adapter portion which includes the second end. Each of the first adapter portion and the second adapter portion is one of a male adapter portion or a female adapter portion. The optical fiber adapter further includes a ferrule disposed within the adapter body, the ferrule extending along the longitudinal axis between a first end and a second end. The optical fiber adapter further includes a thin-film filter provided on one of the first end or the second end of the ferrule, wherein the thin-film filter limits the wavelengths of light transmitted therethrough to within a predetermined wavelength range.

In accordance with some embodiments, an optical fiber connector is provided. The optical fiber connector includes a connector body, the connector body extending along a longitudinal axis between a first end and a second end. The optical fiber connector further includes a ferrule disposed within the connector body, the ferrule extending along the longitudinal axis between a first end and a second end. The optical fiber connector further includes a thin-film filter provided on the second end of the ferrule, wherein the thin-film filter limits the wavelengths of light transmitted therethrough to within a predetermined wavelength range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
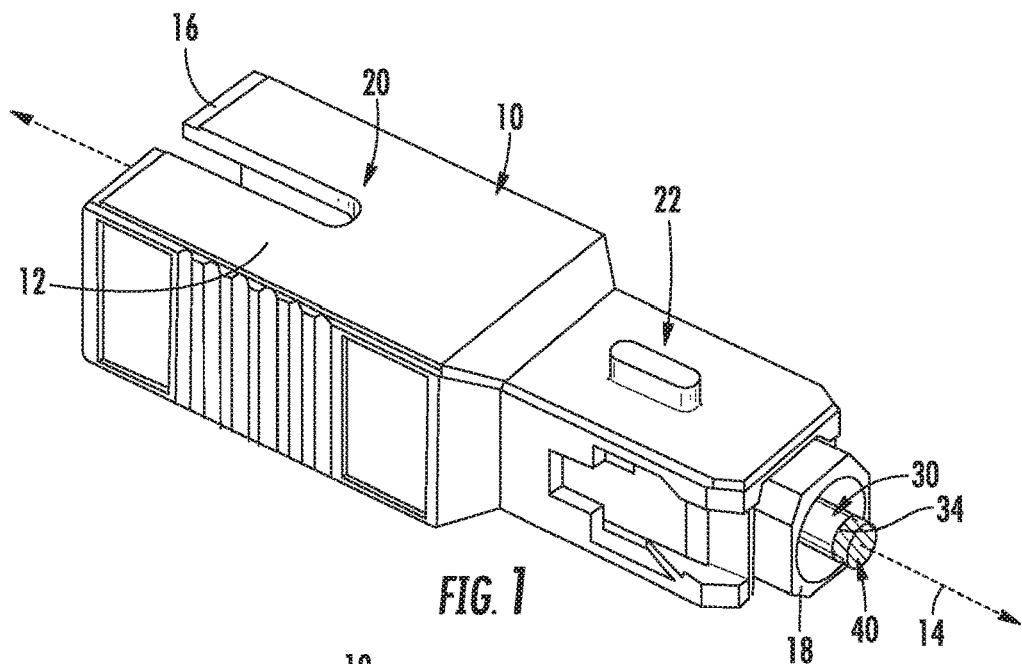
FIG. 1 is a perspective view of an optical fiber adapter in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 6, the present disclosure is generally directed to optical fiber adapters 10. An adapter 10 in accordance with the present disclosure generally connects and provides an interface between optical fiber connectors, such that light can be transmitted therebetween. In general, an adapter 10 in accordance with the present disclosure can have any suitable form which allows for the connection of any suitable connectors, or of suitable connector to an apparatus such as an optical power meter. For example, an adapter may be an SC-to-SC adapter, an LC-to-LC adapter, an SC-to-LC adapter, etc.

As illustrated, an adapter 10 may include an adapter body 12 which extends along a longitudinal axis 14 between a first end 16 and a second end 18. The adapter 10 may include a first adapter portion 20 and a second adapter portion 22, each of which interfaces with a mating connector to provide a connection between the connectors or with an apparatus such as an optical power meter. First adapter portion 20 may include the first end 16, and second adapter portion 22 may include the second end 18.

Figure 4:
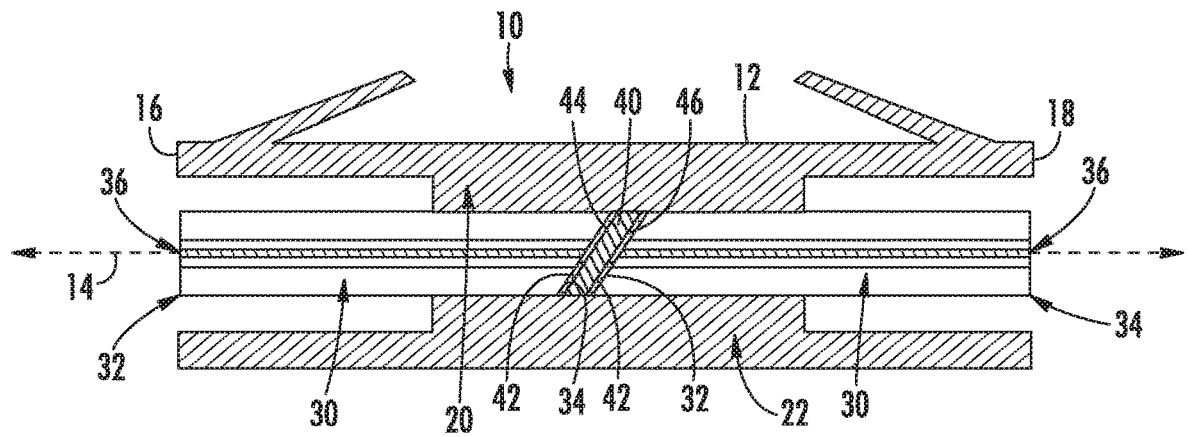
FIG. 4 is a cross-sectional view of a male-to-male optical fiber adapter in accordance with embodiments of the present disclosure.
Figure 5:
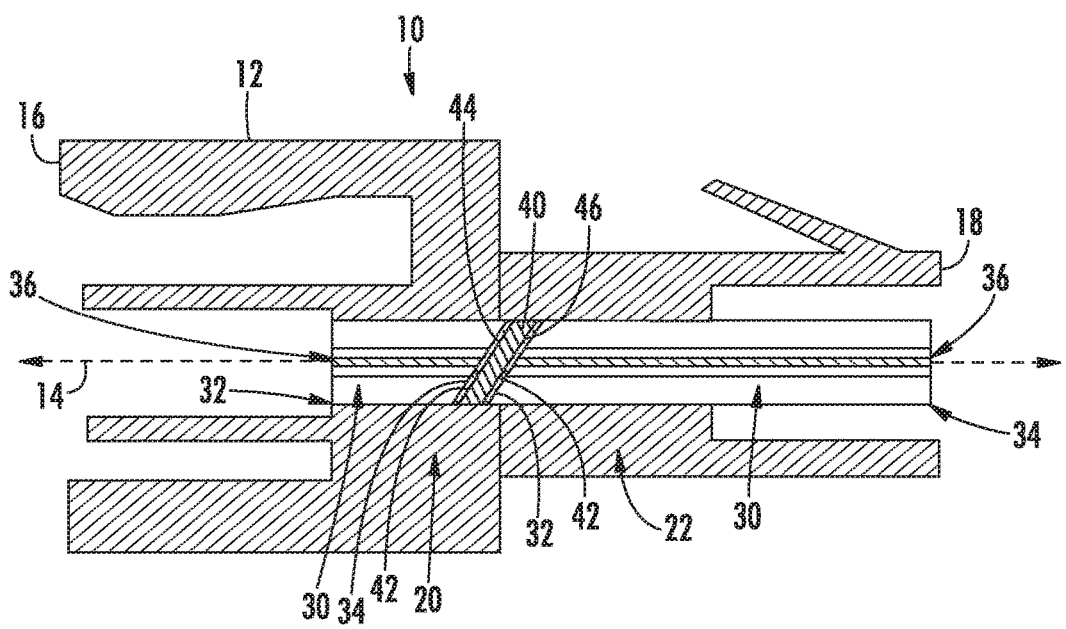
FIG. 5 is a cross-sectional view of a female-to-male optical fiber adapter in accordance with embodiments of the present disclosure.
Figure 6:
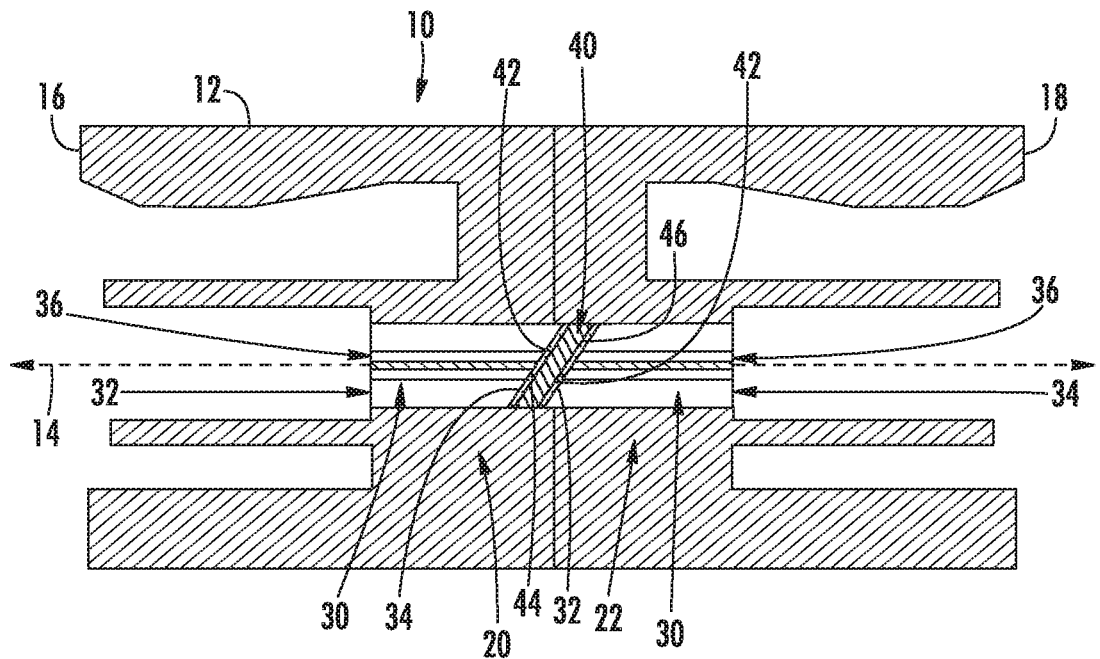
FIG. 6 is a cross-sectional view of a female-to-female optical fiber adapter in accordance with embodiments of the present disclosure.

Each of the first adapter portion 20 and second adapter portion 22 may be a male adapter portion (which thus receives a female socket) or a female adapter portion (which thus receives a male connector). For example, FIGS. 1, 2, 3, and 5 illustrate female-to-male adapters wherein the first adapter portion 20 is female and the second adapter portion 22 is male. FIG. 4 is a male-to-male adapter wherein the first adapter portion 20 is male and the second adapter portion 22 is male. FIG. 6 is a female-to-female adapter wherein the first adapter portion 20 is female and the second adapter portion 22 is female.

One or more ferrules 30 may be disposed within the adapter body 12. Each ferrule 30 may extend along the longitudinal axis 14 between a first end 32 and a second end 34. Any suitable ferrule 30 formed from any suitable material and having any suitable size may be utilized. For example, in some embodiments, a ferrule having a nominal outer diameter of approximately 1.25 millimeters or 2.5 millimeters may be utilized. Ferrules 30 in accordance with the present disclosure may be formed from zirconia, suitable ceramics, suitable metal alloys, suitable plastic composites, or other suitable materials. Ferrule 30 may, in exemplary embodiments, include an optical fiber 36 disposed therein.

An end face may be provided at one or both of the first end 32 and second end 34. The end faces are in exemplary embodiments polished end faces. Further, in some embodiments, one or both end faces may be flat end faces, while in additional or alternative embodiments one or both end faces may be angled end faces. As shown, the plane of a flat end face is generally perpendicular to the longitudinal axis 14, while the plane of an angled end face is generally oriented at an angle to perpendicular to the longitudinal axis 14. In exemplary embodiments, an angled end face may have an angle to perpendicular to the longitudinal axis 14 of between 4 degrees and 12 degrees, such as between 6 degrees and 10 degrees, such as 8 degrees.

Figure 2:
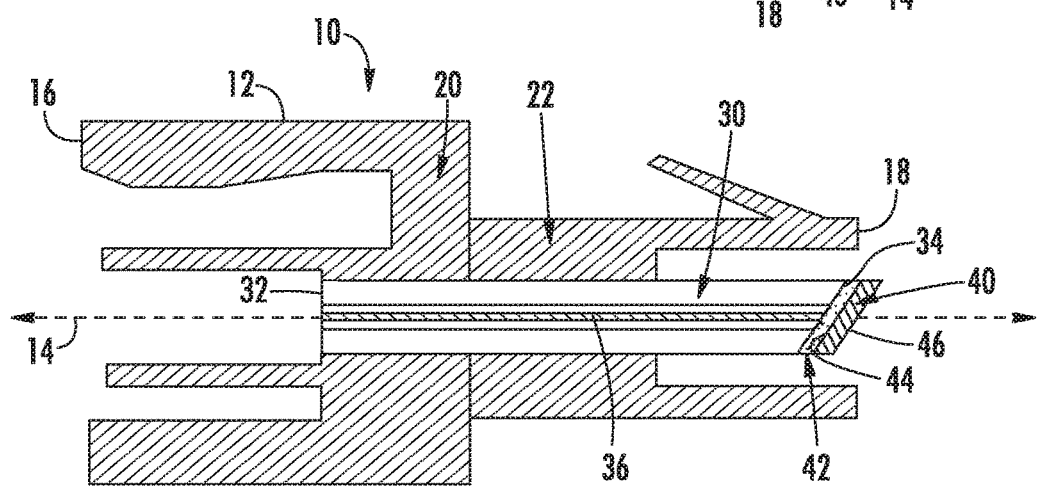
FIG. 2 is a cross-sectional view of a female-to-male optical fiber adapter in accordance with embodiments of the present disclosure.
Figure 3:
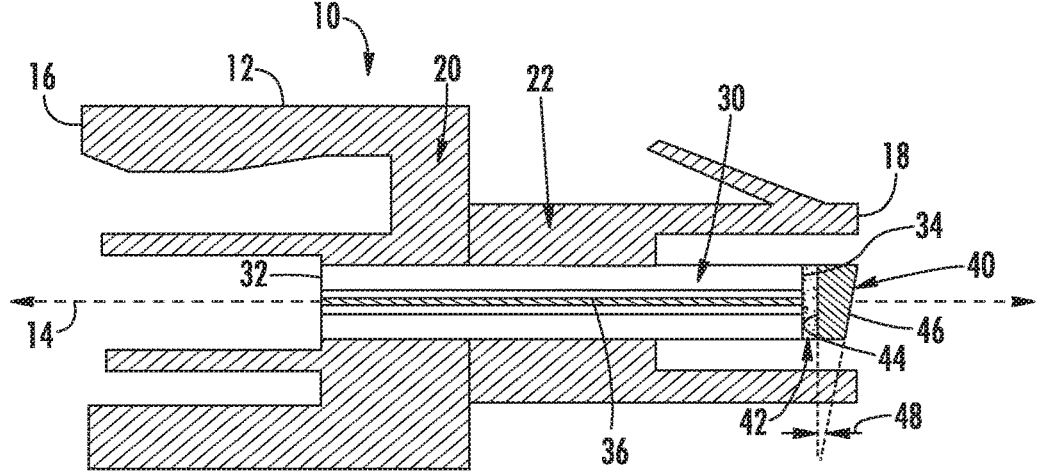
FIG. 3 is a cross-sectional view of a female-to-male optical fiber adapter in accordance with embodiments of the present disclosure.

In some embodiments, as illustrated in FIGS. 2 and 3, only a single ferrule 30 is disposed within the adapter body 12. In these embodiments, the first end 32 may for example be disposed within or extend from the first adapter portion 20, and the second end 34 may be disposed within or extend from the second adapter portion 22. In other embodiments, as illustrated in FIGS. 4-6, a plurality of ferrules 30 (such as two ferrules 30) are disposed within the adapter body 12. For example, a first ferrule 30 and a second ferrule 30 may be disposed within the adapter body 12. In these embodiments, the first end 32 of the first ferrule 30 may for example be disposed within or extend from the first adapter portion 20, and the second end 34 of the second ferrule 30 may be disposed within or extend from the second adapter portion 22. The second end 34 of the first ferrule 30 and the first end 32 of the second ferrule 30 may be proximate each other within the ferrule body 12, such as in some embodiments proximate a transition between the first adapter portion 20 and the second adapter portion 22.

Adapter 10 may further include a thin-film filter 40. The thin-film filter is generally a filter having a suitable size which allows it to be mounted on an end of a ferrule within an adapter or connector. For example, in exemplary embodiments, a thin-film filter in accordance with the present disclosure may have a thickness of between 100 and 5000 microns, such as between 500 and 2000 microns, such as between 800 and 1200 microns. Thin-film filters 40 in accordance with the present disclosure may be formed from any suitable materials. In exemplary embodiments, a filter 40 may be formed from $SiO_2$, ZnS, $MgF_2$, and/or another suitable material.

A thin-film filter 40 in accordance with the present disclosure filters light being transmitted therethrough from adjacent ferrule(s) 30, such that the wavelengths of light being transmitted through the thin-film filter 40 are limited to within a predetermined wavelength range. Light outside of a wavelength range that is transmitted through a filter 40 is blocked, as is generally understood. For example, thin-film filter 40 may have predetermined filtering characteristics, such as the central wavelength and bandwidth of light to be transmitted therethrough. A thin-film filter 40 may, for example, be a band-pass, band-reject, high-pass, low-pass, etc., filter. In some embodiments, more than one thin-film filter 40 may be utilized. Further, such multiple filters may have the same or different filtering characteristics. When multiple filters 40 are utilized, the filters 40 may for example, be aligned in series such that light is transmitted and filter through each filter 40 in sequence.

In exemplary embodiments, the predetermined wavelength range of light transmitted through a filter 40 is between 1540 nm and 1560 nm, such as between 1543 and 1557 nm. Additionally or alternatively, other suitable wavelength ranges may be transmitted through a filter 40. A suitable wavelength range may, for example be within or between the ultraviolet, visual, and/or infrared waveband(s).

A filter 40 in accordance with the present disclosure may be provided on the first end 32 or second end 34 of a ferrule, such as on the first end face or second end face. Accordingly, light emitted from such end face encounters the filter 40, and is transmitted therethrough or blocked thereby. For example, in single ferrule embodiments, a filter 40 may be provided on the second end 34 of the ferrule 30, as shown. In multiple ferrule embodiments, a filter 40 may be provided between the first ferrule 30 and second ferrule 30 within the adapter body 10. The filter 40 may also be provided on the first ferrule 30 and/or the second ferrule 30. For example, the filter 40 may be provided on the second end 34 of the first ferrule 30 and/or the first end 32 of the second ferrule 30.

As discussed, a filter 40 may be provided on a first end 32 and/or second end 34. For example, in some embodiments, filter 40 may be directly applied to and in contact with the first end 32 (i.e. the first end face) and/or the second end 34 (i.e. the second end face). In other embodiments, an intervening material may connect the filter 40 to the first end 32 and/or second end 34. For example, an optical adhesive 42 may connect a filter 40 to the first end 32 (i.e. the first end face) and/or the second end 34 (i.e. the second end face), and thus be disposed between and in contact with the filter 40 and the first end 32 and/or second end 34. Optical adhesive 42 may, for example, be formed from a compatible optical grade adhesive, such as a suitable epoxy, which may for example be time-cured, UV cured, or heat cured. Suitable examples include Arabic Gum, Epo-Tek® 201 or Norland NOA68.

As discussed, in some embodiments, an end 32, 34 of a ferrule 30 has an angled end face. In some embodiments, filter 40 may be provided on such angled end face. In other embodiments, an end 32, 34 of a ferrule 30 has a flat end face. In some embodiments, filter 40 may be provided on such flat end face.

In some embodiments, and in particular when the filter 40 is provided on an angled end face, the planes of a front end 44 and back end 46 of the filter 40 may be parallel. In alternative embodiments, and in particular in some embodiments when the filter 40 is provided on a flat end face, the planes of the front end 44 and back end 46 of the filter 40 may be non-parallel. For example, the thin-film filter 40 may have a backside wedge angle 48 of between 4 and 12 degrees. The backside wedge angle 48 is generally an angle between the front end 44 and back end 46, as shown. Alternatively, in some flat end face embodiments, the planes of the front end 44 and back end 46 may be parallel.

Figure 7:
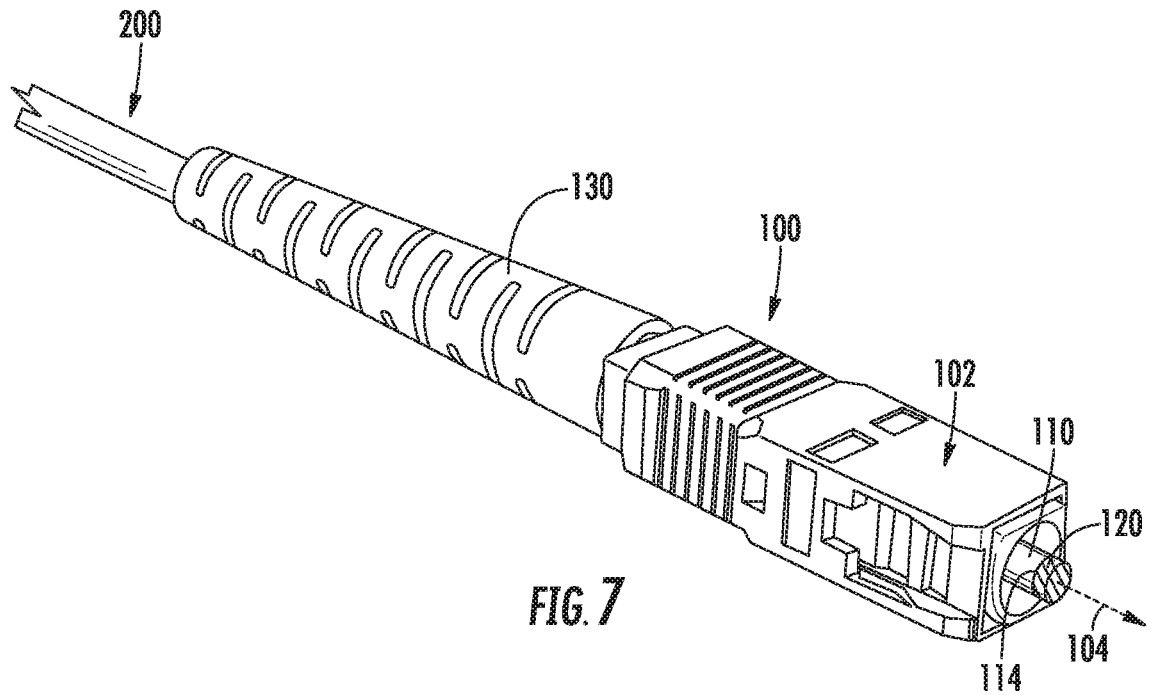
FIG. 7 is a perspective view of an optical fiber connector in accordance with embodiments of the present disclosure.
Figure 8:
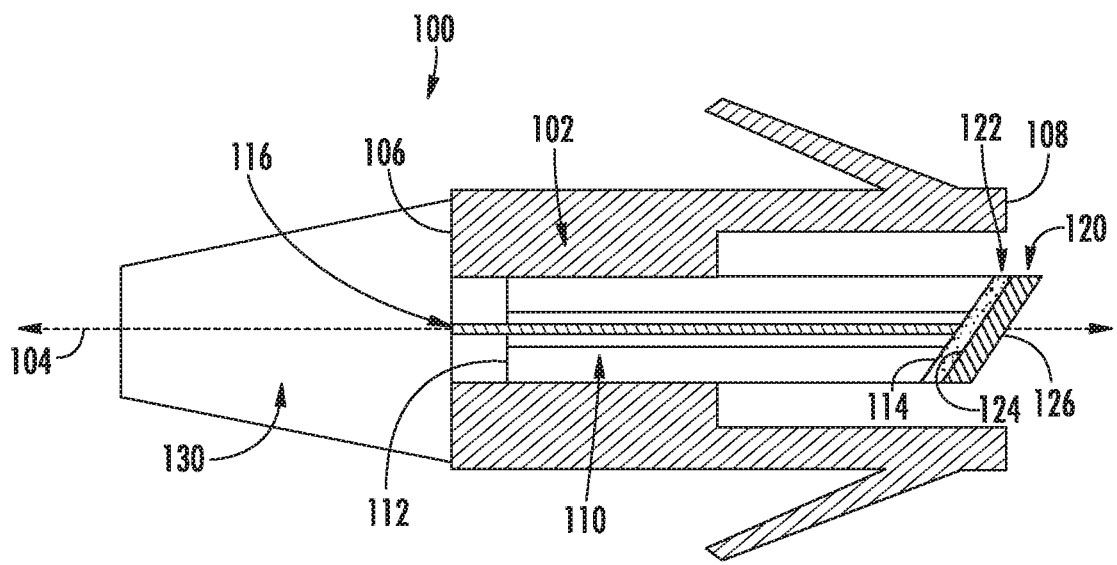
FIG. 8 is a cross-sectional view of an optical fiber connector in accordance with embodiments of the present disclosure.
Figure 9:
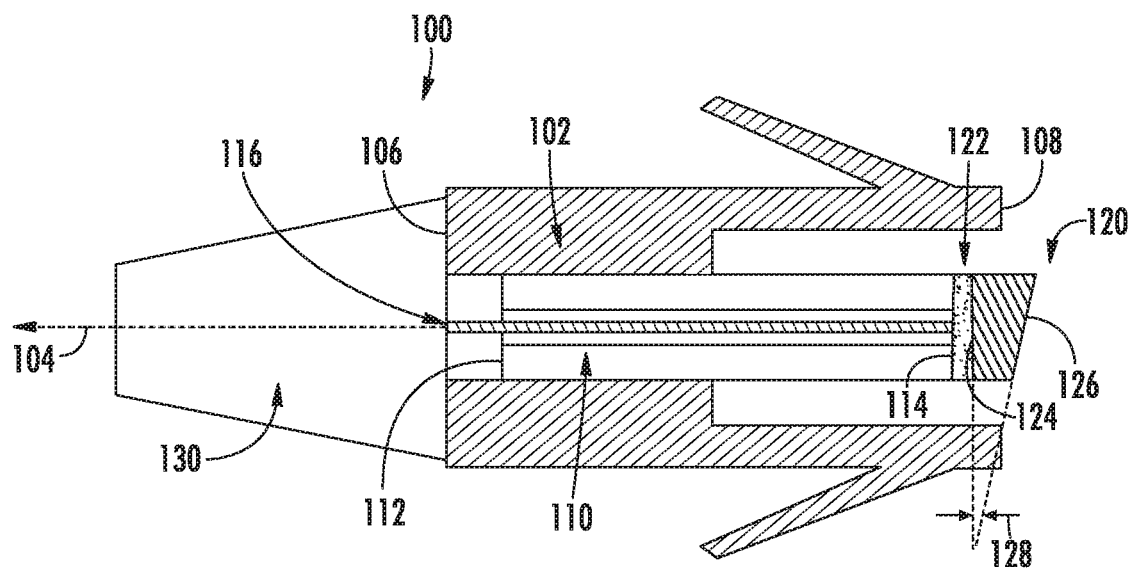
FIG. 9 is a cross-sectional view of an optical fiber connector in accordance with embodiments of the present disclosure.

Referring now to FIGS. 7 through 9, the present disclosure is further generally directed to optical fiber connectors 100. A connector 100 in accordance with the present disclosure generally terminates an optical fiber and facilitates the connection of that optical fiber to another component, such as another connector, an optical measurement apparatus, etc. In exemplary embodiments, such connection is provided via an adapter. In general, a connector 100 in accordance with the present disclosure can have any suitable form. For example, a connector may be an SC, LC connector, or any other suitable connector.

As illustrated, a connector 100 may include a connector body 102 which extends along a longitudinal axis 104 between a first end 106 and a second end 108. A ferrule 110 (which in exemplary embodiments is a single ferrule) may be disposed within the connector body 102. The ferrule 110 may extend along the longitudinal axis 104 between a first end 112 and a second end 114. Any suitable ferrule 110 formed from any suitable material and having any suitable size may be utilized. For example, in some embodiments, a ferrule having a nominal outer diameter of approximately 1.25 millimeters or 2.5 millimeters may be utilized. Ferrules 110 in accordance with the present disclosure may be formed from zirconia, suitable ceramics, suitable metal alloys, suitable plastic composites, or other suitable materials. Ferrule 110 may, in exemplary embodiments, include an optical fiber 116 disposed therein.

An end face may be provided at one or both of the first end 112 and second end 114. The end faces are in exemplary embodiments polished end faces. Further, in some embodiments, one or both end faces may be flat end faces, while in additional or alternative embodiments one or both end faces may be angled end faces. As shown, the plane of a flat end face is generally perpendicular to the longitudinal axis 104, while the plane of an angled end face is generally oriented at an angle to perpendicular to the longitudinal axis 104. In exemplary embodiments, an angled end face may have an angle to perpendicular to the longitudinal axis 104 of between 4 degrees and 12 degrees, such as between 6 degrees and 10 degrees, such as 8 degrees.

First end 112 is, in exemplary embodiments, disposed within the connector body 102. Second end 114 may be disposed within the connector body 102, or may extend from the connector body 102, such as from the second end 108 thereof.

Connector 100 may further include a thin-film filter 120. The thin-film filter is generally a filter having a suitable size which allows it to be mounted on an end of a ferrule within an adapter or connector. For example, in exemplary embodiments, a thin-film filter in accordance with the present disclosure may have a thickness of between 100 and 5000 microns, such as between 500 and 2000 microns, such as between 800 and 1200 microns. Thin-film filters 120 in accordance with the present disclosure may be formed from any suitable materials. In exemplary embodiments, a filter 120 may be formed from $SiO_2$, $ZnS$, $MgF_2$, and/or another suitable material.

A thin-film filter 120 in accordance with the present disclosure filters light being transmitted therethrough from adjacent ferrule(s) 110, such that the wavelengths of light being transmitted through the thin-film filter 120 are limited to within a predetermined wavelength range. Light outside of a wavelength range that is transmitted through a filter 120 is blocked, as is generally understood. For example, thin-film filter 120 may have predetermined filtering characteristics, such as the central wavelength and bandwidth of light to be transmitted therethrough. A thin-film filter 120 may, for example, be a band-pass, band-reject, high-pass, low-pass, etc., filter. In some embodiments, more than one thin-film filter 120 may be utilized. Further, such multiple filters may have the same or different filtering characteristics. When multiple filters 120 are utilized, the filters 120 may for example, be aligned in series such that light is transmitted and filter through each filter 120 in sequence.

In exemplary embodiments, the predetermined wavelength range of light transmitted through a filter 120 is between 1540 nm and 1560 nm, such as between 1543 and 1557 nm. Additionally or alternatively, other suitable wavelength ranges may be transmitted through a filter 120. A suitable wavelength range may, for example be within or between the ultraviolet, visual, and/or infrared waveband(s).

A filter 120 in accordance with the present disclosure may be provided in exemplary embodiments on the second end 114 (such as the second end face) of a ferrule 110, although alternatively filter 120 could be provided on the first end 112 or between neighboring ferrules within the connector body 102. Accordingly, light emitted from such end face encounters the filter 120, and is transmitted therethrough or blocked thereby.

In some embodiments, filter 120 may be directly applied to and in contact with an end of the filter 120, such as the second end 34 (i.e. the second end face). In other embodiments, an intervening material may connect the filter 120 and the end. For example, an optical adhesive 122 may connect a filter 120 to the end, and thus be disposed between and in contact with the filter 120 and the end. Optical adhesive 122 may, for example, be formed from a compatible optical grade adhesive, such as a suitable epoxy, which may for example be time-cured, UV cured, or heat cured. Suitable examples include Arabic Gum, Epo-Tek® 201 or Norland NOA68.

As discussed, in some embodiments, an end 112, 114 of a ferrule 110 has an angled end face. In some embodiments, filter 120 may be provided on such angled end face. In other embodiments, an end 112, 114 of a ferrule 110 has a flat end face. In some embodiments, filter 120 may be provided on such flat end face.

In some embodiments, and in particular when the filter 120 is provided on an angled end face, the planes of a front end 124 and back end 126 of the filter 120 may be parallel. In alternative embodiments, and in particular in some embodiments when the filter 120 is provided on a flat end face, the planes of the front end 124 and back end 126 of the filter 120 may be non-parallel. For example, the thin-film filter 120 may have a backside wedge angle 128 of between 4 and 12 degrees. The backside wedge angle 128 is generally an angle between the front end 124 and back end 126, as shown. Alternatively, in some flat end face embodiments, the planes of the front end 124 and back end 126 may be parallel.

Connector 100 may, in some embodiments, further include a boot 130. Boot 130 may extend from the first end 106 of the connector body 102, and may provide a transition and strain relief between connector 100 and an optical fiber cable which includes an optical fiber that is terminated in connector 100.

Connector 100 may terminate an optical fiber of any suitable optical fiber apparatus, such as any suitable optical fiber cable. For example, in some embodiments, connector 100 terminates an optical fiber of a jumper cable 200. In these embodiments, an optical fiber of the jumper cable 200 extends into the connector 100 and is connected (such as via splicing or another suitable connection operation) to the ferrule 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical fiber adapter, comprising:
   an adapter body, the adapter body extending along a longitudinal axis between a first end and a second end and comprising a first adapter portion which includes the first end and a second adapter portion which includes the second end, wherein each of the first adapter portion and the second adapter portion is one of a male adapter portion or a female adapter portion;
   a ferrule disposed within the adapter body, the ferrule extending along the longitudinal axis between a first end and a second end, the first end having an end face approximately perpendicular to the longitudinal axis;
   a thin-film filter provided on the first end of the ferrule, wherein the thin-film filter has a backside wedge angle greater than 4 degrees, and wherein the thin-film filter limits the wavelengths of light transmitted therethrough to within a predetermined wavelength range.

2. The optical fiber adapter of claim 1, wherein the thin-film filter has a thickness of between 100 and 5000 microns.

3. The optical fiber adapter of claim 1, wherein the predetermined wavelength range is between 1540 nm and 1560 nm.

4. The optical fiber adapter of claim 1, wherein the thin-film filter is formed from one of $SiO_2$, ZnS, or $MgF_2$.

5. The optical fiber adapter of claim 1, wherein an optical adhesive connects the thin-film filter to the one of the first end or the second end of the ferrule.

6. The optical fiber adapter of claim 5, wherein the optical adhesive comprises an optical grade adhesive.

7. The optical fiber adapter of claim 1, wherein the second end of the ferrule has an angled end face.

8. The optical fiber adapter of claim 1, wherein the wedge angle is between 4 and 12 degrees.

9. The optical fiber adapter of claim 1, wherein the thin-film filter comprises a plurality of thin-film filters aligned in series.

10. The optical fiber adapter of claim 1, wherein the first adapter portion is a female adapter portion and the second adapter portion is a female adapter portion.

11. The optical fiber adapter of claim 1, wherein the first adapter portion is a male adapter portion and the second adapter portion is a female adapter portion.

12. The optical fiber adapter of claim 1, wherein the ferrule is a single ferrule disposed within the adapter body, and wherein the thin-film filter is provided on the second end of the ferrule.

13. The optical fiber adapter of claim 1, wherein the ferrule is a plurality of ferrules comprising a first ferrule and a second ferrule, and wherein the thin-film filter is provided on and between the first ferrule and the second ferrule within the adapter body.

14. An optical fiber connector, comprising:
   a connector body, the connector body extending along a longitudinal axis between a first end and a second end;
   a ferrule disposed within the connector body, the ferrule extending along the longitudinal axis between a first end and a second end;

a thin-film filter provided on the second end of the ferrule, wherein the thin-film filter limits the wavelengths of light transmitted therethrough to within a predetermined wavelength range, and wherein the thin-film filter has a backside wedge angle of between 4 and 12 degrees; and an optical adhesive connecting the thin-film filter to the second end of the ferrule.

15. The optical fiber connector of claim 14, wherein the thin-film filter has a thickness of between 100 and 5000 microns.

16. The optical fiber connector of claim 14, wherein the predetermined wavelength range is between 1540 nm and 1560 nm.

17. The optical fiber connector of claim 14, wherein the thin-film filter is formed from one of $SiO_2$, ZnS, or $MgF_2$.

18. The optical fiber connector of claim 14, wherein the optical adhesive comprises an optical grade adhesive.

19. The optical fiber connector of claim 14, wherein the second end of the ferrule has a flat end face.

20. The optical fiber connector of claim 14, wherein the second end of the ferrule has an angled end face.

21. The optical fiber connector of claim 14, wherein the first end of the ferrule is disposed within the connector body and the second end of the ferrule extends from the second end of the connector body.

22. A jumper cable comprising the optical fiber connector of claim 14.

* * * * *